United States Patent Office 3,153,975
Patented Oct. 27, 1964

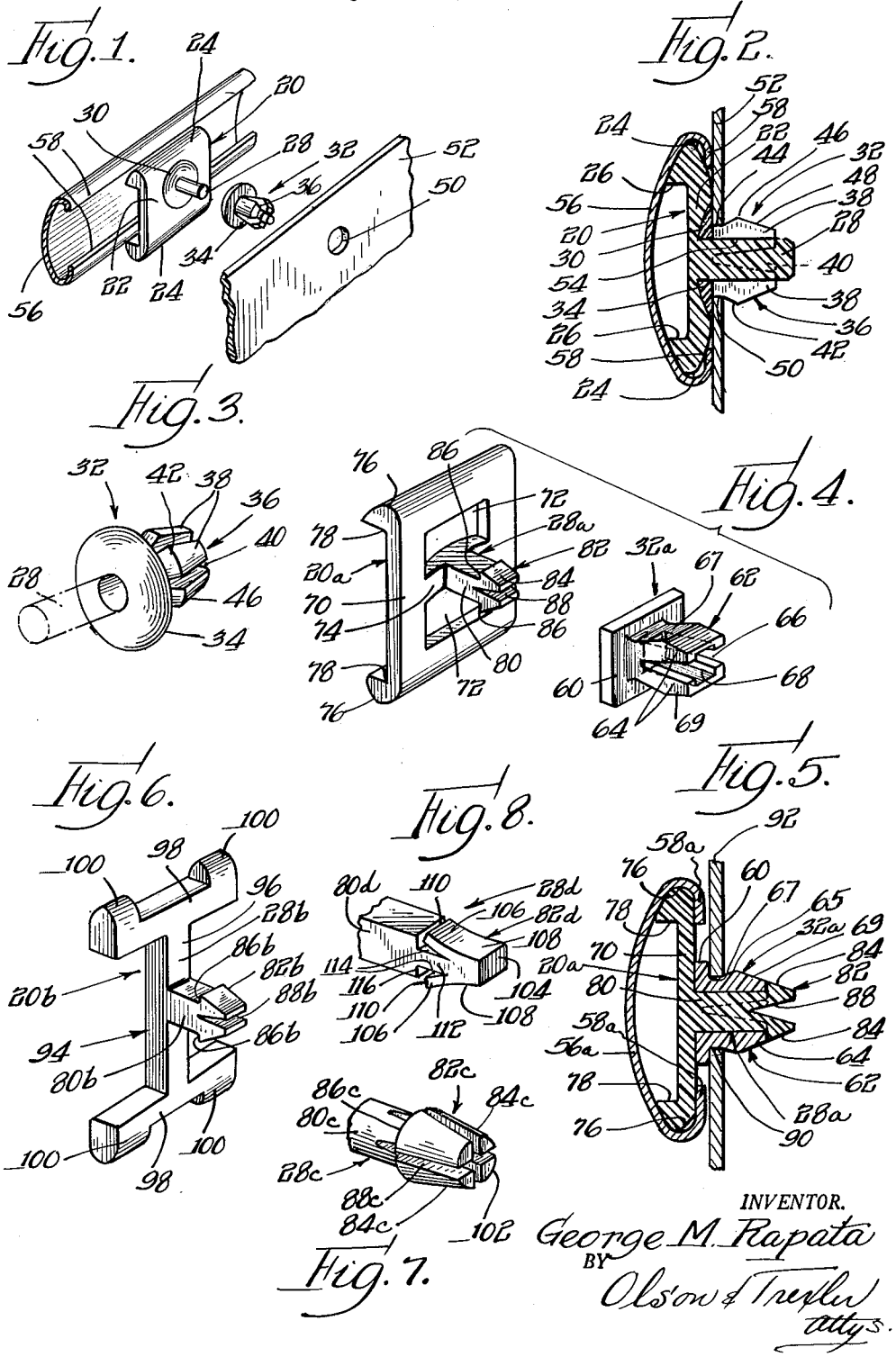

3,153,975
FASTENER UNIT
George M. Rapata, Chicago, Ill., assignor to Illinois Tool Works Inc., Chicago, Ill., a corporation of Delaware
Original application Jan. 21, 1954, Ser. No. 405,330. Divided and this application Jan. 11, 1962, Ser. No. 188,914
3 Claims. (Cl. 85—80)

This invention relates generally to fasteners, and more particularly to fasteners for mounting articles of manufacture such as emblems, molding clips, and the like on apertured panels without the necessity of access to both sides of the panels, and to a unit comprising such a fastener and article.

This application is a division of my pending application S.N. 405,330, filed January 21, 1954, and entitled "Fastener Unit" and now abandoned.

In applying emblems, letters, or other indicia to appliances and the like, in applying molding strips to automobiles, and in many other instances it is impossible to attain access to the rear side of the panel. In other instances it is undesirable to obtain access due to the difficulty of coordinating action simultaneously from two sides of the panel, and due to the extra time that is needed for acting on both sides of the panel. Accordingly, various efforts have been made to provide "blind" fasteners, i.e., those which can be installed from the front or work side of a panel. Such fasteners often have been difficult or expensive to produce or use, have failed to hold parts tightly against rattling, have failed to seal the apertures with which they are associated, have been made of critical materials, or have otherwise been unsatisfactory.

It is an object of this invention to provide a fastener and an associated article of manufacture as a unit, which unit is quickly and simply installed on an apertured panel from only one side thereof.

A further object of this invention is to provide such a unit which automatically seals the aperture with which it is associated.

More specifically, it is an object of this invention to provide a unit of the foregoing character wherein the fastener is insertable into an aperture in a panel for more or less permanently receiving a stud on the article of manufacture.

Another object of this invention is to provide a blind fastener and associated article of manufacture which positively locks in place in an aperture in a panel.

Yet another object is to provide a blind fastener unit including a relatively soft and deformable anchor member.

Still another object is to provide a blind fastener unit having an anchor member which is imperforate on the back side of the apertured panel in which the unit is installed, thereby sealing the panel.

Other and further objects and advantages of the present invention will be apparent from the following description when taken in connection with the accompanying drawings wherein:

FIG. 1 is an exploded perspective view of an article of manufacture and associated parts embodying the principles of my invention;

FIG. 2 is a cross-sectional view of the same parts in assembled relation;

FIG. 3 is a perspective view of the female fastening member;

FIG. 4 is an exploded perspective view of a modification of the invention;

FIG. 5 is a cross-sectional view showing the modification of FIG. 4 in installed position; and FIGS. 6–8 are perspective views showing modifications of the male member of the article or unit.

The invention herein disclosed is capable of use with substantially any article of manufacture that is to be installed on or is to be carried by a panel. In the first embodiment of the invention I have shown the article as a molding clip 20 of a type suitable for use in holding trim or molding on automobiles, appliances, and the like. The clip 20 preferably is molded of plastic and comprises a body portion 22 which is somewhat flexible, and which is provided along its opposite longitudinal edges with rounded off retaining portions or shoulders 24. These retaining portions or shoulders necessarily are of a predetermined thickness for properly engaging the interior of an ornamental molding or trim whereas the center portion of the body 22 must be sufficiently thin to permit a certain amount of flexing for allowing passage of an ornamental strip over the retaining portions or shoulders 24. This results in the shoulders meeting the center portion of the body at shelves or projections 26.

The molding clip 20 is provided with an integral stud 28 projecting perpendicularly therefrom. In the illustrative embodiment this stud is cylindrical in configuration, but it will be apparent hereinafter that other configurations can be used. The body is provided with a dished out recess 30 surrounding the stud.

A female fastener or plug is provided for association with the foregoing parts and is identified generally by the numeral 32. The female fastener or plug 32 comprises a small button-like head or cap 34 from which there projects an integral shank or collapsible stud portion 36. The shank or collapsible stud portion is generally circular in cross section in this illustrative embodiment and comprises a plurality of fingers 38 separated by slots 40. The fingers flare outwardly as at 42 from a relatively thin neck 44 to a point of maximum diameter forming a retaining shoulder 46, and then tapering inwardly from the retaining shoulder as indicated at 48. The female fastener is somewhat flexible and preferably is made of plastic similarly to the molding clip 20 and integral stud 28. Although I do not wish to limit myself by so stating, nylon and polyethylene are examples of plastic materials that are useful for this purpose.

The female fastener is snapped through an aperture 50 in a panel 52, the fingers 38 flexing inwardly during such insertion, and thereafter snapping outwardly so that the outwardly flared portion 42 of the fingers traps the female fastener with the narrow neck 44 fitting in the aperture, and with the cap or head 32 overlying the aperture. The female fastener thus completely seals the aperture except for the central aperture or bore 54 through the cap or head 34 and between the fingers 38 of the shank 36. The integral stud 28 of the molding clip 30 is inserted through this central aperture or bore, thus simultaneously completing sealing off of the aperture and positively preventing further collapse or inward flexing of the shank fingers 38, thereby locking the female fastener against withdrawal. The stud 28 and fingers, being preferably made of plastic, have sufficient mutual friction to prevent unauthorized withdrawal of the stud of the female fastener. The head or cap 34 of the female fastener is received in the dished out section 30 of the molding clip so that the central portion of the molding clip fits firmly against the panel 52 with no chance of vibration thereagainst.

An ornamental trim or molding strip 56 of generally conventional configuration and having inturned confronting longitudinal flanges 58 snaps over the molding clip in the usual fashion with the confronting flanges 58 thereof lying behind the retaining portions or shoulders 24 of the molding clip. It will be apparent that during the installation of such a strip, the molding clip flexes longitudinally through the body portion, principally adjacent the shelf portions 26.

A modification of the invention is shown in FIG. 4. The parts in large measure are similar, and in certain respects similar numerals will be used with the addition of the suffix $a$. The female fastener or plug 32$a$ is square or rectangular in cross section. At this point it might be well to note that the female fastener or plug 32$a$ serves as a male fastener relative to the panel in which it is inserted, but it is a female fastener in the unit consisting of the female fastener and the stud bearing article. The female fastener in this instance has a head 60 which is square or rectangular in longitudinal section or elevation as opposed to the button head 34 previously disclosed. The fastener 32$a$ is provided with a shank 62 comprising a pair of arms or fingers 64 having a normally diverging slot 66 between them. A square or rectangular aperture or bore 68 extends through the head 60 and between the arms or fingers 64. The arms 64 are planar on their side surfaces, but on their top and bottom surfaces taper outwardly at 65 from a restricted neck 67 to a point of maximum dimension, and then converge as at 69.

The article to be associated with the female fastener 62 again comprises a molding clip 20$a$. This molding clip includes a generally rectangular body portion 70 having a pair of rectangular apertures 72 therein leaving a central, transverse bar 74. This configuration materially aids in molding the clip. The bar 74 can be bowed outwardly as shown to accommodate variations in thickness in the panel with which it is to be associated, and also to create spring tension on the molding which subsequently is to be mounted on the clip. The molding clip is provided with curved retaining edges 76 of considerably greater thickness than the remainder of the body 70, and joined thereto at a shelf or internal shoulder 78.

An integral stud 28$a$ projects forwardly from the body 70 of the molding clip 20$a$. The stud 28$a$ comprises a shank 80 and a head 82. The shank is complementary in configuration with the square or rectangular aperture or bore 68 through the female fastener 32$a$. The head 82 is planar with the lateral sides of the shank, while the top and bottom edges thereof are beveled as at 84, and are joined to the shank at retaining shoulders 86. A V-shaped slot or groove 88 extends through the head 82 and part way into the shank 80 to promote flexing of the head.

The female fastener 32$a$ is inserted into a square hole 90 in a panel 92, the tapering surfaces 69 serving to cam the arms 64 inwardly during insertion. The stud 80 of the molding clip then is pushed through the central aperture 68 of the fastener, the beveled surfaces 84 camming the two sections of the head in to permit passage thereof through the central aperture 68. After such passage, the head portions spring out to their normal position with the shoulders 86 of the head engaging the end of the shank 62 of the female fastener 32$a$. The shank 80 of the molding clip stud prevents collapse or flexing of the female fastener shank whereby to prevent withdrawal of the female fastener. The shoulders 86 of the molding clip stud head positively prevent withdrawal of the molding clip. Accordingly, the molding clip is positively locked to the panel 92, and the square or rectangular configurations disclosed preclude rotation of the unit comprising the molding clip and female fastener.

An ornamental trim or molding strip 56$a$ similar to that previously described and having confronting edges or flanges 58$a$ is adapted to snap over the molding clip in the manner previously described.

The body of the molding clip can be constructed differently from the previous showing as illustrated in FIG. 6. In this figure the molding clip is identified as 20$b$, with the body 94 comprising a vertical, substantially rectangular bar 96 having cross bars 98 at either end thereof. The cross bars are provided adjacent their opposite ends and at the outer edges thereof with semi-cylindrical or otherwise curved retaining portions or shoulders 100. The integral stud 28$b$ is identical with the stud 28$a$, including the square or rectangular shank 80$b$ and the tapered head 82$b$ having the retaining shoulders 86$b$ and the V-shaped slot 88$b$.

Installation of the molding clip just described is identical with the one last previously described. When a molding or trim strip is snapped over the retaining surfaces 100, it will be understood that the cross bars 98 bent somewhat to facilitate installation of the strip. It is important that each of the molding clips described be capable of yielding transversely of the trim strip to facilitate proper association of the clip and strip.

The integral stud of the molding clip also may vary in configuration, and two modifications are shown in FIGS. 7 and 8. Both of these modifications are more nearly similar to the studs 28$a$ and $b$ than to the stud 28 in that they positively lock in the female fastener, in contrast to the frictional locking of the stud 28. Referring now more particularly to FIG. 7, there is shown a stud 28$c$ which is integral with an article of manufacture such as any one of the molding clips heretofore described, the article being omitted from FIG. 7. The stud 28$c$ is circular in cross section and comprises a shank 80$c$ and an enlarged head 82$c$ which likewise is generally circular in cross section. The head converges toward its outer end 102 as indicated at 84$c$, forming in effect a truncated cone. The head is provided with retaining shoulders 86$c$, and is provided with right angularly arranged, substantially V-shaped slots or grooves 88$c$ extending into the shank 80$c$. Thus, when the stud is inserted through a central circular aperture of an associated female fastener, the slots 88$c$ facilitate flexing of the head and of the shank adjacent the head as the surfaces 84$c$ cam the portions of the head inwardly. In this case, it will be understood that the stud is formed of resilient material, preferably plastic, similar to the other embodiments disclosed in this application.

A further modification of the stud is shown in FIG. 8 and is identified by the numeral 28$d$. This stud is substantially square or rectangular in cross section and includes a shank 80$d$ which is integral with an article of manufacture (not shown) such as any one of the molding clips heretofore described. The head 82$d$ of the stud varies structurally from any of those heretofore shown, although functionally it is similar to all but the first in that it positively locks in an associated female fastener. The head 82$d$ is provided with a blunt front end 104, generally similar to those previously described except that it is not slotted. Instead, the head is provided with a pair of rearwardly diverging leaves 106 providing outer camming faces 108 and rear retaining or locking edges 110. These leaves branch out from the front of a stem 112, leaving rearwardly diverging slots 114 between the leaves and stem. The stem 112 joins the shank 80$d$ at steps or shoulders 116. When the stud 28$d$ is inserted through a complementary square or rectangular aperture in a female fastener, the cam surfaces 108 force the leaves 106 to flex in against the stem 112 to permit passage of the stud through the central aperture of the fastener. After passage of the head 82$d$ completely through the fastener, the leaves 106 spring out to their original position with the edges 110 thereof locking against the end of the fastener to prevent retraction of the article and stud. The stud of course prevents collapse of the fastener, and thereby prevents withdrawal of the fastener. Accordingly, the entire unit comprising the article of manufacture and its integral stud, and the fastener are locked against withdrawal from their installed position. In the present instance wherein a square or rectangular configuration is used, the unit also is locked against rotating movement. Furthermore, in each instance the unit serves to seal the hole in which it is installed.

The various embodiments of the invention herein shown and described are for illustrative purposes only. Various additional embodiments will no doubt occur to others skilled in the art, and form a part of this invention insofar as they fall within the spirit and scope of the appended claims.

I claim:

1. A unit comprising an independently formed and discrete article of manufacture and fastening means for mounting said article of manufacture on an apertured panel, said article of manufacture including a stud projecting rearwardly therefrom and having locking means at least at the remote end thereof in the form of projecting opposed shoulder means comprising leaf-like members attached to the adjacent end of the stud, said stud having slot means extending rearwardly toward the free end of the stud beneath said leaf-like members permitting yielding of said shoulder means toward one another, said fastening means including a plug-like member having a head adapted to seat against a panel adjacent an aperture therein and a shank extending from said head and adapted to be inserted through the panel aperture, said plug-like member having an axial passage extending through said head and into said shank for accommodating said stud, said shank having a transversely reduced portion inwardly of said head and a yieldable portion of increased transverse dimension relative to said reduced portion for engagement behind said panel adjacent said aperture in opposition to said head after insertion of said shank, said shank having locking means spaced inwardly of said reduced portion engageable with the locking means on the stud after passing through the shank passage for positively locking said stud in said fastening means, said stud upon insertion into the passage in the plug-like member preventing yielding of said transversely yieldable shank portion whereby to hold said unit mounted on said panel.

2. A unit as claimed in claim 1, wherein said stud of the article of manufacture includes a laterally projecting portion to seat against the head of the shank in assembled position.

3. A unit as claimed in claim 1, wherein the stud and shank passage are complementally out-of-round to prevent relative rotation therebetween.

References Cited in the file of this patent

UNITED STATES PATENTS

| | | |
|---|---|---|
| 1,743,492 | Sipe | Jan. 14, 1930 |
| 2,088,955 | Hamill | Aug. 3, 1937 |
| 2,244,975 | Timmerman | June 10, 1941 |
| 2,314,770 | Cogswell | Mar. 23, 1943 |
| 2,340,423 | O'Shaughnessy | Feb. 1, 1944 |
| 2,542,144 | Kearns | Feb. 20, 1951 |
| 2,555,420 | Richardson | June 5, 1951 |
| 2,745,620 | Murphy | May 15, 1956 |
| 2,941,439 | Rapata | June 21, 1960 |